(12) United States Patent
Wei et al.

(10) Patent No.: US 11,603,089 B2
(45) Date of Patent: Mar. 14, 2023

(54) HYBRID VEHICLE TORQUE ADJUSTING METHOD AND DEVICE

(71) Applicant: GREAT WALL MOTOR COMPANY LIMITED, Hebei (CN)

(72) Inventors: Wenbin Wei, Hebei (CN); Shanshan Ran, Hebei (CN); Miaomiao Shen, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 300 days.

(21) Appl. No.: 16/760,615

(22) PCT Filed: Oct. 30, 2018

(86) PCT No.: PCT/CN2018/112773
§ 371 (c)(1),
(2) Date: Apr. 30, 2020

(87) PCT Pub. No.: WO2019/085909
PCT Pub. Date: May 9, 2019

(65) Prior Publication Data
US 2020/0346635 A1    Nov. 5, 2020

(30) Foreign Application Priority Data

Oct. 31, 2017 (CN) .......................... 201711046632.1

(51) Int. Cl.
*B60W 20/30* (2016.01)
*B60W 10/08* (2006.01)
*B60L 15/20* (2006.01)

(52) U.S. Cl.
CPC ............. *B60W 20/30* (2013.01); *B60L 15/20* (2013.01); *B60W 10/08* (2013.01)

(58) Field of Classification Search
CPC ................. B60W 20/30; B60W 10/08; B60W 2710/105; B60W 2050/0052; B60L 15/20
See application file for complete search history.

(56) References Cited

FOREIGN PATENT DOCUMENTS

| CN | 101066674 A | 11/2007 |
|---|---|---|
| CN | 201592648 U | 9/2010 |

(Continued)

OTHER PUBLICATIONS

Reif, Automobile Electronics, Xi'an Jiaotong University Press, Apr. 30, 2017, 7 pages.

(Continued)

*Primary Examiner* — Tisha D Lewis
(74) *Attorney, Agent, or Firm* — Nixon Peabody LLP; Jeffrey L. Costellia (57) ABSTRACT

Disclosed are a hybrid vehicle torque adjusting method and device. The method includes: acquiring a requested torque of a front-axle engine and a requested torque of a rear-axle motor, determining a first compensation torque according to the filtered requested torque of the front-axle engine and an actual output torque of a front-axle transmission, and determining a target torque of the rear-axle motor according to the first compensation torque and the requested torque of the rear-axle motor. In the method, since a difference exists between the filtered requested torque of the front-axle engine and the actual output torque of the front-axle transmission during shifting of the front-axle transmission, after the difference is compensated by the rear-axle motor, a working condition that affects a dynamic performance of an entire vehicle can be eliminated, torques can be coordinated, and the dynamic performance of the entire vehicle can be improved.

12 Claims, 5 Drawing Sheets

(56) References Cited

FOREIGN PATENT DOCUMENTS

| CN | 101982360 | A |   | 3/2011  |           |
|----|-----------|---|---|---------|-----------|
| CN | 102381311 | A |   | 3/2012  |           |
| CN | 104773157 | A |   | 7/2015  |           |
| CN | 105774799 | A |   | 7/2016  |           |
| CN | 106184215 | A |   | 12/2016 |           |
| CN | 106476643 | A |   | 3/2017  |           |
| CN | 106553634 | A |   | 4/2017  |           |
| CN | 106696945 | A | * | 5/2017  | B60W 10/06 |
| CN | 106800019 | A |   | 6/2017  |           |
| CN | 104828087 | B |   | 8/2017  |           |
| DE | 102010015424 | A1 |   | 10/2011 |        |
| DE | 102013016756 | B4 | * | 7/2015  | B60K 1/00 |
| FR | 2935660 | A1 |   | 3/2010 |          |
| GB | 2468630 | A | * | 9/2010 | G05D 17/02 |
| JP | 2000299904 | A |   | 10/2000 |          |
| JP | 2017177877 | A |   | 10/2017 |          |
| WO | 2008050038 | A1 |   | 5/2008 |           |
| WO | WO-2010026347 | A1 | * | 3/2010 | B60K 6/442 |
| WO | 2016177950 | A1 |   | 11/2016 |          |

OTHER PUBLICATIONS

CN Search Report for CN 201711046632.1 dated Jun. 28, 2020, 4 pages.
CN Office Action for CN 201711046632.1 dated Jul. 3, 2020, 6 pages.
EESR for EP18872361.3 dated Nov. 3, 2020, 8 pages.
ISR for PCT/CN2018/112773 dated Jan. 4, 2019, 5 pages.
CN Search Report for CN 201711046632.1 dated Mar. 13, 2020, 3 pages.
CN Office Action for CN 201711046632.1 dated Mar. 24, 2020, 6 pages.

\* cited by examiner

HYBRID VEHICLE TORQUE ADJUSTING METHOD AND DEVICE

CROSS-REFERENCE TO RELATED APPLICATIONS

This application is a national stage application of PCT/CN2018/112773 which claims the priority to Chinese Patent Application No. 201711046632.1 filed by State Intellectual Property Office of The P.R.C. on Oct. 31, 2017, and titled "Hybrid Vehicle Torque Adjusting Method and Device", the entire contents of which are incorporated herein by reference.

FIELD OF TECHNOLOGY

The disclosure relates to the field of vehicle technologies, and more particularly, to a hybrid vehicle torque adjusting method and device.

BACKGROUND

With the growing shortage of energy and increasingly serious problem of environmental pollution, all vehicle manufacturers have turned their eyes on battery electric vehicles and hybrid vehicles. Since specific energy and specific power in a battery technology of the battery electric vehicles still need to be improved, a driving distance and a selling price of the battery electric vehicles cannot be accepted by most consumers. Therefore, development of the hybrid vehicles is of great significance.

At present, the hybrid vehicles mainly aim to reduce fuel consumption of an entire vehicle and improve a dynamic performance of the entire vehicle.

However, a working condition that affects the dynamic performance of the entire vehicle, such as a torque loss during shifting, is usually not considered in a torque framework of the existing hybrid vehicles, resulting in poor dynamic performance of the entire vehicle.

SUMMARY

In light of this, the disclosure aims to provide a hybrid vehicle torque adjusting method to compensate for a torque loss during shifting and improve a dynamic performance of an entire vehicle.

In order to achieve the objective above, the technical solution of the disclosure is implemented as follows.

A hybrid vehicle torque adjusting method is provided, wherein a hybrid vehicle includes a front-axle engine, a front-axle transmission and a rear-axle motor, and the method includes:

acquiring a requested torque of the front-axle engine and a requested torque of the rear-axle motor;

determining a first compensation torque according to the filtered requested torque of the front-axle engine and an actual output torque of the front-axle transmission, and determining a target torque of the rear-axle motor according to the first compensation torque and the requested torque of the rear-axle motor.

Preferably, before the step of determining the target torque of the rear-axle motor according to the first compensation torque and the requested torque of the rear-axle motor, the method further includes:

determining a second compensation torque according to the filtered requested torque of the front-axle engine and the requested torque of the front-axle engine.

Preferably, the step of determining the target torque of the rear-axle motor according to the first compensation torque and the requested torque of the rear-axle motor includes:

adding the first compensation torque, the second compensation torque and the requested torque of the rear-axle motor to acquire the target torque of the rear-axle motor.

Preferably, the step of determining the first compensation torque according to the filtered requested torque of the front-axle engine and the actual output torque of the front-axle transmission includes:

when receiving a shift request, acquiring a first difference between the filtered requested torque of the front-axle engine and the actual output torque of the front-axle transmission; and filtering a product between the first difference and a compensation coefficient to acquire the first compensation torque.

Preferably, the step of determining the second compensation torque according to the filtered requested torque of the front-axle engine and the requested torque of the front-axle engine includes:

acquiring a second difference between the requested torque of the front-axle engine and the filtered requested torque of the front-axle engine;

determining whether the second difference is less than a maximum supporting torque and greater than a minimum supporting torque;

when the second difference is less than the maximum supporting torque and greater than the minimum supporting torque, determining whether an absolute value of the second difference is less than a dynamically acceptable torque; and when the absolute value of the second difference is less than the dynamically acceptable torque, determining the second difference as the second compensation torque.

Preferably, after the step of determining the target torque of the rear-axle motor according to the first compensation torque and the requested torque of the rear-axle motor, the method further includes:

determining whether the target torque of the rear-axle motor is less than a maximum torque of the motor and greater than a minimum torque of the motor; and when the target torque of the rear-axle motor is less than the maximum torque of the motor and greater than the minimum torque of the motor, filtering the target torque of the rear-axle motor to acquire a final torque corresponding to the rear-axle motor.

Compared with the prior art, the hybrid vehicle torque adjusting method according to the disclosure has the following advantages:

(1) In the hybrid vehicle torque adjusting method according to the disclosure, since a difference exists between the filtered requested torque of the front-axle engine and the actual output torque of the front-axle transmission during shifting of the front-axle transmission, after the difference is compensated by the rear-axle motor, a working condition that affects a dynamic performance of an entire vehicle can be eliminated, torques can be coordinated according to a status of the entire vehicle, and the dynamic performance of the entire vehicle can be improved based on original fuel saving.

(2) In the hybrid vehicle torque adjusting method according to the disclosure, since the filtered requested torque of the front-axle engine can filter out partial torque relative to the requested torque of the front-axle engine during torque loading, a difference exists between the filtered requested torque of the front-axle engine and the requested torque of the front-axle engine, and the difference can directly affect requirements of a driver on the dynamic performance of the entire vehicle. Therefore, the difference is compensated by the rear-axle motor, so that a working condition that affects a dynamic performance of an entire vehicle can be eliminated, torques can be coordinated according to a status of the entire vehicle, and the dynamic performance of the entire vehicle can be improved based on original fuel saving.

(3) In the hybrid vehicle torque adjusting method according to the disclosure, the first difference between the filtered requested torque of the front-axle engine and the actual output torque of the front-axle transmission is multiplied by the corresponding compensation coefficient to avoid inaccuracy of the first compensation torque caused by shaking of the driver during actual driving, thus accurately improving the dynamic performance of the entire vehicle.

(4) In the hybrid vehicle torque adjusting method according to the disclosure, the target torque of the rear-axle motor is filtered to avoid vibration of the vehicle caused by direct step jump of the torque to the target torque, thus improving experience of the driver.

Another objective of the disclosure is to provide a hybrid vehicle torque adjusting device to compensate for a torque loss during shifting and improve a dynamic performance of an entire vehicle.

In order to achieve the objective above, the technical solution of the disclosure is implemented as follows.

A hybrid vehicle torque adjusting device includes:
a requested torque acquisition module configured to acquire a requested torque of a front-axle engine and a requested torque of a rear-axle motor;
a first compensation torque determination module configured to determine a first compensation torque according to the filtered requested torque of the front-axle engine and an actual output torque of the front-axle transmission; and
a target torque determination module configured to determine a target torque of the rear-axle motor according to the first compensation torque and the requested torque of the rear-axle motor.

Preferably, the device further includes:
a second compensation torque determination module configured to determine a second compensation torque according to the filtered requested torque of the front-axle engine and the requested torque of the front-axle engine.

Preferably, the target torque determination module includes:
a target torque calculation module configured to add the first compensation torque, the second compensation torque and the requested torque of the rear-axle motor to acquire the target torque of the rear-axle motor.

Preferably, the first compensation torque determination module includes:
a first difference acquisition module configured to, when receiving a shift request, acquire a first difference between the filtered requested torque of the front-axle engine and the actual output torque of the front-axle transmission; and
a first compensation torque calculation module configured to filter a product between the first difference and a compensation coefficient to acquire the first compensation torque.

Preferably, the second compensation torque determination module includes:
a second difference acquisition module configured to acquire a second difference between the requested torque of the front-axle engine and the filtered requested torque of the front-axle engine;

a first determination module configured to determine whether the second difference is less than a maximum supporting torque and greater than a minimum supporting torque;
a second determination module configured to, when the second difference is less than the maximum supporting torque and greater than the minimum supporting torque, determine whether an absolute value of the second difference is less than a dynamically acceptable torque; and
a second compensation torque calculation module configured to, when the absolute value of the second difference is less than the dynamically acceptable torque, determine the second difference as the second compensation torque.

Preferably, the device further includes:
a determination module configured to determine whether the target torque of the rear-axle motor is less than a maximum torque of the motor and greater than a minimum torque of the motor; and
a final torque determination module configured to, when the target torque of the rear-axle motor is less than the maximum torque of the motor and greater than the minimum torque of the motor, filter the target torque of the rear-axle motor to acquire a final torque corresponding to the rear-axle motor.

Compared with the prior art, the hybrid vehicle torque adjusting device has the same advantages as the above hybrid vehicle torque adjusting method, and will not be repeatedly elaborated here.

Another objective of the disclosure is to provide a computer readable medium storing a computer program for implementing the above hybrid vehicle torque adjusting method to compensate for a torque loss during shifting and improve a dynamic performance of an entire vehicle.

BRIEF DESCRIPTION OF THE DRAWINGS

The drawings constituting a part of the disclosure are provided to further understand the disclosure. The illustrative embodiments and the description of the disclosure are used to explain the disclosure, but are not intended to limit the disclosure. In the drawings.

DESCRIPTION OF THE EMBODIMENTS

It should be noted that the embodiments in the disclosure and the features in the embodiments can be combined with each other without conflicts.

The disclosure will be described in detail hereinafter with reference to the drawings and the embodiments.

A hybrid vehicle according to the embodiment of the disclosure includes a front-axle engine, a front-axle transmission and a rear-axle motor.

First Embodiment

Figure 1:
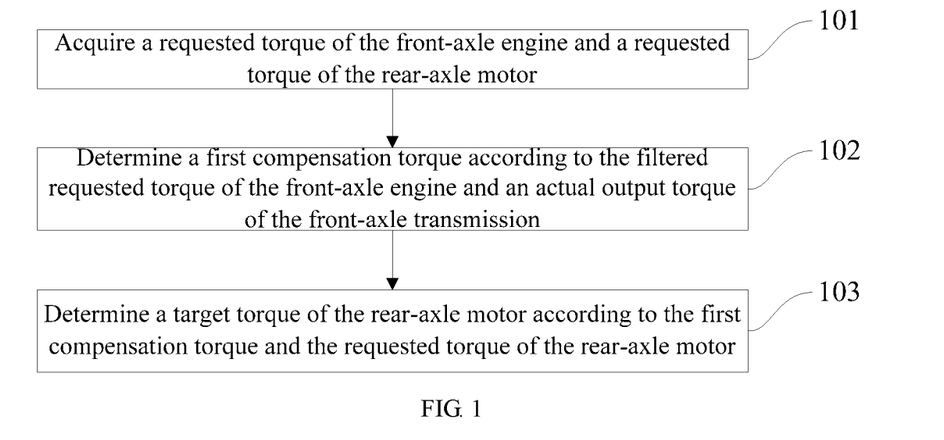
FIG. 1 is a flow chart of a hybrid vehicle torque adjusting method according to a first embodiment of the disclosure.

With reference to FIG. 1, the first embodiment of the disclosure provides a flow chart of a hybrid vehicle torque adjusting method, and the method may specifically include the following steps.

In step 101, a requested torque of the front-axle engine and a requested torque of the rear-axle motor are acquired.

In the embodiment of the disclosure, a requested torque of an entire vehicle is determined by detecting a current vehicle speed of the hybrid vehicle and an opening degree of an accelerator pedal, and then the requested torque of the entire vehicle is reasonably distributed to the front-axle engine and the rear-axle motor.

At this time, working states of the front-axle engine and the rear-axle motor need to be detected, and the requested torque of the front-axle engine and the requested torque of the rear-axle motor are determined according to the requested torque of the entire vehicle and the working states of the front-axle engine and the rear-axle motor.

For example, when a battery capacity corresponding to the rear-axle motor is greater than a preset capacity, a distribution ratio of the requested torque of the rear-axle motor is correspondingly increased, and when the battery capacity corresponding to the rear-axle motor is less than the preset capacity, the distribution ratio of the requested torque of the rear-axle motor is correspondingly reduced. When a load of the front-axle engine is lower than a preset load, a distribution ratio of the requested torque of the front-axle engine is correspondingly increased, and when the load of the front-axle engine is higher than the preset load, the distribution ratio of the requested torque of the front-axle engine is correspondingly reduced. When an efficiency of the front-axle engine is lower than a maximum efficiency, the distribution ratio of the requested torque of the front-axle engine is correspondingly increased.

After the requested torque of the entire vehicle is reasonably distributed to the front-axle engine and the rear-axle motor, the requested torque of the front-axle engine and the requested torque of the rear-axle motor are acquired.

The hybrid vehicle according to the embodiment of the disclosure further includes a front-axle BSG (Belt Driven Starter Generator) motor, and the BSG motor is connected with the front-axle engine. At a starting phase of the vehicle, the BSG motor rapidly starts the front-axle engine to realize automatic starting and stopping of the front-axle engine, and compared with direct starting of the front-axle engine, starting the front-axle engine by the BSG motor can effectively reduce power consumption and improve emission. After normal operation of the front-axle engine, the BSG motor no longer participates in power drive of the entire vehicle.

In step 102, a first compensation torque is determined according to the filtered requested torque of the front-axle engine and an actual output torque of the front-axle transmission.

In the embodiment of the disclosure, in practical application, the requested torque of the front-axle engine needs to be filtered to acquire the filtered requested torque of the front-axle engine.

For example, if the requested torque of the front-axle engine needs to be increased from 500 Nm to 1000 Nm, in practical application, in order to avoid vibration of the vehicle caused by direct jump of the torque, the requested torque of the front-axle engine cannot directly jump from 500 Nm to 1000 Nm, but shall be gradually increased from 500 Nm to 1000 Nm within a certain period of time. The requested torque of the front-axle engine can be increased by 100 Nm within 1 second, and then the filtered requested torque of the front-axle engine is 500 Nm→600 Nm→700 Nm→800 Nm→900 Nm→1000 Nm respectively within 5 seconds.

Due to clutch interruption and lag in torque calculation during shifting of the transmission, a difference exists between the filtered requested torque of the front-axle engine and the actual output torque of the front-axle transmission. The first compensation torque to be compensated is determined according to the filtered requested torque of the front-axle engine and the actual output torque of the front-axle transmission.

In step 103, a target torque of the rear-axle motor is determined according to the first compensation torque and the requested torque of the rear-axle motor.

In the embodiment of the disclosure, the first compensation torque to be compensated is compensated by the rear-axle motor. In practical application, the rear-axle motor also needs to provide partial dynamic performance of the vehicle, and the target torque of the rear-axle motor is determined according to the first compensation torque and the distributed requested torque of the rear-axle motor. The target torque of the rear-axle motor is a torque to be actually provided by the rear-axle motor.

Compared with the prior art, the hybrid vehicle torque adjusting method according to the disclosure has the following advantages.

In the hybrid vehicle torque adjusting method according to the disclosure, since a difference exists between the filtered requested torque of the front-axle engine and the actual output torque of the front-axle transmission during shifting of the front-axle transmission, after the difference is compensated by the rear-axle motor, a working condition that affects a dynamic performance of an entire vehicle can be eliminated, torques can be coordinated according to a status of the entire vehicle, and the dynamic performance of the entire vehicle can be improved based on original fuel saving.

Second Embodiment

Figure 2:
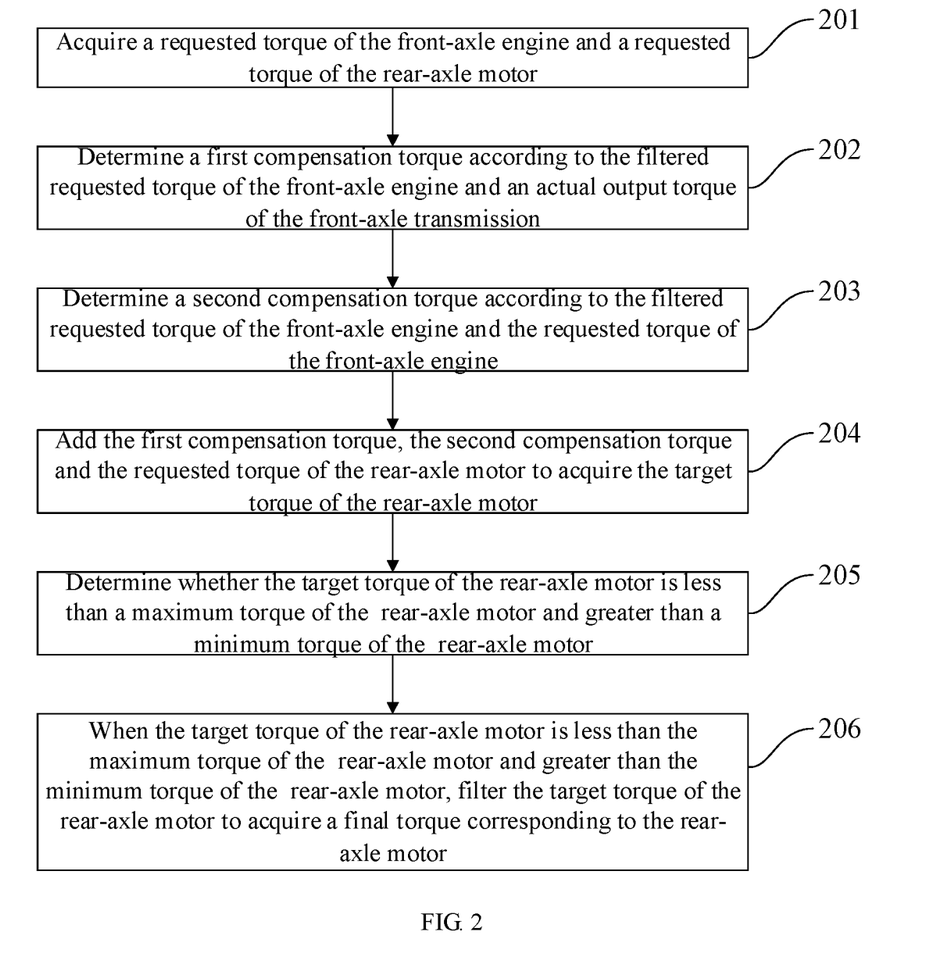
FIG. 2 is a flow chart of a hybrid vehicle torque adjusting method according to a second embodiment of the disclosure.

With reference to FIG. 2, the second embodiment of the disclosure provides a flow chart of a hybrid vehicle torque adjusting method, and the method may specifically include the following steps.

In step 201, a requested torque of the front-axle engine and a requested torque of the rear-axle motor are acquired.

The step has a similar principle as the step 101 in the first embodiment, which will not be repeated here.

In step 202, a first compensation torque is determined according to the filtered requested torque of the front-axle engine and an actual output torque of the front-axle transmission.

In the embodiment of the disclosure, due to transmission torque interference during shifting of the transmission, a difference exists between the filtered requested torque of the front-axle engine and the actual output torque of the front-axle transmission. The first compensation torque to be compensated is determined according to the filtered requested torque of the front-axle engine and the actual output torque of the front-axle transmission.

Specifically, when receiving a shift request, a first difference between the filtered requested torque of the front-axle engine and the actual output torque of the front-axle transmission is acquired. A product between the first difference and a compensation coefficient is filtered to acquire the first compensation torque.

Figure 3:
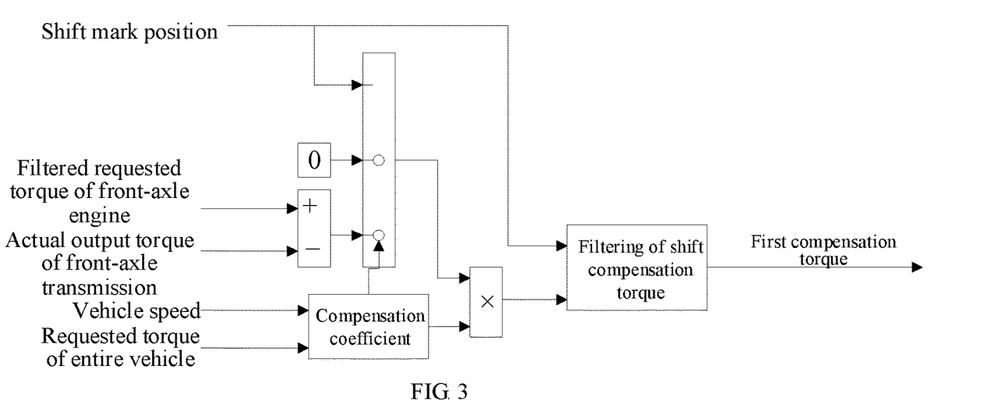
FIG. 3 is a schematic diagram illustrating a calculation process of a first compensation torque according to the second embodiment of the disclosure.

FIG. 3 is a schematic diagram illustrating a calculation process of the first compensation torque according to the second embodiment of the disclosure.

When the entire vehicle has no shift request, a shift mark position is 0, and the first compensation torque is 0 Nm. When the entire vehicle has the shift request, the shift mark position is 1, a requested torque of the entire vehicle needs to follow an interference torque of the front-axle transmission, and the actual output torque of the front-axle transmission shall be consistent with the interference torque of the front-axle transmission. However, due to clutch interruption and lag in torque calculation during shifting of the front-axle transmission, the actual output torque of the front-axle transmission is subtracted from the filtered requested torque of the front-axle engine during shifting of the front-axle transmission to acquire the first difference between the filtered requested torque of the front-axle engine and the actual output torque of the front-axle transmission.

Since a driver may shake during actual driving, the first difference needs to be multiplied by one compensation coefficient to acquire a corresponding shift compensation torque. In practical application, in order to avoid vibration of the vehicle caused by direct jump of the shift compensation torque, the shift compensation torque also needs to be filtered to acquire the first compensation torque.

It should be noted that the compensation coefficient is a calibration value. Different models of vehicles have different compensation coefficient tables, and corresponding compensation coefficients of each model of vehicle at different vehicle speeds and/or under different requested torques of the entire vehicle are measured in advance, thus forming the compensation coefficient tables corresponding to the different models of vehicles. When the vehicle speed and the requested torque of the entire vehicle are determined, the corresponding compensation coefficient is found from the compensation coefficient table corresponding to this model of vehicle according to the vehicle speed and the requested torque of the entire vehicle.

In step 203, a second compensation torque is determined according to the filtered requested torque of the front-axle engine and the requested torque of the front-axle engine.

In the embodiment of the disclosure, since the filtered requested torque of the front-axle engine can filter out partial torque relative to the requested torque of the front-axle engine during torque loading, a difference exists between the filtered requested torque of the front-axle engine and the requested torque of the front-axle engine. In order to be able to meet requirements of the driver on the dynamic performance of the entire vehicle to the greatest extent, the second compensation torque to be compensated is determined according to the filtered requested torque of the front-axle engine and the requested torque of the front-axle engine.

Specifically, a second difference between the requested torque of the front-axle engine and the filtered requested torque of the front-axle engine is acquired. Whether the second difference is less than a maximum supporting torque and greater than a minimum supporting torque is determined. When the second difference is less than the maximum supporting torque and greater than the minimum supporting torque, whether an absolute value of the second difference is less than a dynamically acceptable torque is determined. When the absolute value of the second difference is less than the dynamically acceptable torque, the second difference is determined as the second compensation torque.

The driver can control an opening degree of an accelerator pedal, and when the opening degree of the accelerator pedal is changed, a corresponding torque of the front-axle engine can also be changed. In order to avoid the vibration of the vehicle caused by direct jump of the torque, the filtered requested torque of the front-axle engine can also be changed correspondingly.

The filtered requested torque of the front-axle engine is subtracted from the requested torque of the front-axle engine during torque loading to acquire the second difference between the requested torque of the front-axle engine and the filtered requested torque of the front-axle engine.

For example, when the opening degree of the accelerator pedal is changed from 30% to 40%, the requested torque of the front-axle engine needs to be changed from 1000 Nm at current to 2000 Nm. However, in practical application, in order to avoid the vibration of the vehicle caused by the direct jump of the torque, the requested torque of the front-axle engine cannot directly jump from 1000 Nm to 2000 Nm, but is gradually increased from 1000 Nm to 2000 Nm within a certain period of time. If the requested torque of the front-axle engine is gradually increased from 1000 Nm to 2000 Nm within 10 seconds, the corresponding filtered requested torque of the front-axle engine is 1600 Nm at a $5^{th}$ second, and then the second difference is 400 Nm relative to the requested torque of the front-axle engine of 2000 Nm.

After the second difference is acquired by calculation, whether the second difference is less than the maximum supporting torque and greater than the minimum supporting torque is judged. When the second difference is less than the maximum supporting torque and greater than the minimum supporting torque, whether the absolute value of the second difference is less than the dynamically acceptable torque is determined. When the absolute value of the second difference is less than the dynamically acceptable torque, the second difference is determined as the second compensation torque, and when the absolute value of the second difference is greater than or equal to the dynamically acceptable torque, the second compensation torque is 0 Nm.

The maximum supporting torque, the minimum supporting torque and the dynamically acceptable torque are all calibration values.

The maximum supporting torque and the minimum supporting torque are calibrated according to a battery temperature corresponding to the rear-axle motor, a battery remaining capacity, a current ambient temperature, the opening degree of the accelerator pedal, etc. When the second difference is greater than the maximum supporting torque or the second difference is less than the minimum supporting torque, a torque loss during torque loading does not need to be compensated, and the corresponding second compensation torque is 0 Nm.

Corresponding dynamically acceptable torques at different vehicle speeds and/or under different requested torques of the front-axle engine are measured in advance to form a dynamically acceptable torque table. When the vehicle speed and the requested torque of the front-axle engine are determined, a corresponding dynamically acceptable torque is found from the dynamically acceptable torque table according to the vehicle speed and the requested torque of the front-axle engine.

Since the requested torque of the front-axle engine can be changed from high to low or from low to high during torque loading, when the requested torque of the front-axle engine is changed from low to high, the second difference acquired by subtracting the filtered requested torque of the front-axle engine from the requested torque of the front-axle engine is positive. When the requested torque of the front-axle engine is changed from high to low, the second difference acquired by subtracting the filtered requested torque of the front-axle engine from the requested torque of the front-axle engine is negative, while the dynamically acceptable torques in the dynamically acceptable torque table are all positive. Therefore, the absolute value of the second difference needs to be taken, and the absolute value of the second difference is compared with the dynamically acceptable torque.

In step 204, the first compensation torque, the second compensation torque and the requested torque of the rear-axle motor are added to acquire the target torque of the rear-axle motor.

In the embodiment of the disclosure, the first compensation torque and the second compensation torque acquired by calculation, and the requested torque of the rear-axle motor distributed for the rear-axle motor are added to acquire the target torque of the rear-axle motor.

In step 205, whether the target torque of the rear-axle motor is less than a maximum torque of the motor and greater than a minimum torque of the motor is determined.

In the embodiment of the disclosure, after the target torque of the rear-axle motor is acquired by calculation, whether the target torque of the rear-axle motor is less than the maximum torque of the motor and greater than the minimum torque of the motor also needs to be judged.

The maximum torque of the motor and the minimum torque of the motor respectively represent a maximum torque and a minimum torque that can be outputted by the rear-axle motor. The torque loss during shifting and torque loading can only be compensated within a bearing range of the rear-axle motor.

In step 206, when the target torque of the rear-axle motor is less than the maximum torque of the motor and greater than the minimum torque of the motor, the target torque of the rear-axle motor is filtered to acquire a final torque corresponding to the rear-axle motor.

In practical application, when the target torque of the rear-axle motor is less than the maximum torque of the motor and greater than the minimum torque of the motor, in order to avoid the vibration of the vehicle caused by direct step jump of the torque to the target torque, the target torque of the rear-axle motor needs to be filtered to acquire the final torque corresponding to the rear-axle motor, which is namely the actual output torque of the rear-axle motor.

When the final torque corresponding to the rear-axle motor is equal to the target torque of the rear-axle motor, the torque change of the rear-axle motor is ended, and correspondingly, the filtering is also ended.

Compared with the prior art, the hybrid vehicle torque adjusting method according to the disclosure has the following advantages.

(1) In the hybrid vehicle torque adjusting method according to the disclosure, since a difference exists between the filtered requested torque of the front-axle engine and the actual output torque of the front-axle transmission during shifting of the front-axle transmission, after the difference is compensated by the rear-axle motor, a working condition that affects a dynamic performance of an entire vehicle can be eliminated, torques can be coordinated according to a status of the entire vehicle, and the dynamic performance of the entire vehicle can be improved based on original fuel saving.

(2) In the hybrid vehicle torque adjusting method according to the disclosure, since the filtered requested torque of the front-axle engine can filter out partial torque relative to the requested torque of the front-axle engine during torque loading, a difference exists between the filtered requested torque of the front-axle engine and the requested torque of the front-axle engine, and the difference can directly affect requirements of a driver on the dynamic performance of the entire vehicle. Therefore, the difference is compensated by the rear-axle motor, so that a working condition that affects a dynamic performance of an entire vehicle can be eliminated, torques can be coordinated according to a status of the entire vehicle, and the dynamic performance of the entire vehicle can be improved based on original fuel saving.

(3) In the hybrid vehicle torque adjusting method according to the disclosure, the first difference between the filtered requested torque of the front-axle engine and the actual output torque of the front-axle transmission is multiplied by the corresponding compensation coefficient to avoid inaccuracy of the first compensation torque caused by shaking of the driver during actual driving, thus accurately improving the dynamic performance of the entire vehicle.

(4) In the hybrid vehicle torque adjusting method according to the disclosure, the target torque of the rear-axle motor is filtered to avoid vibration of the vehicle caused by direct step jump of the torque to the target torque, thus improving experience of the driver.

Third Embodiment

Figure 4:
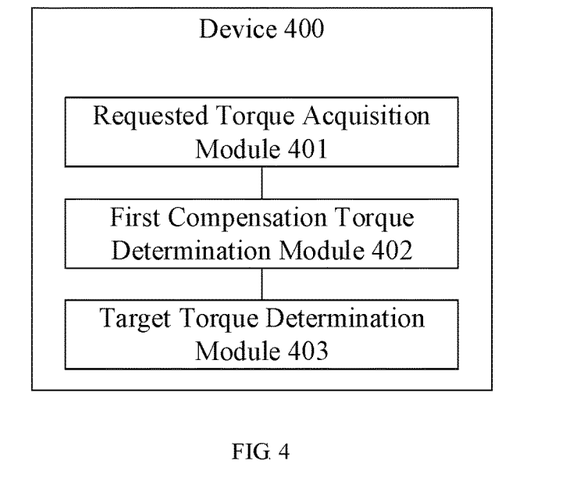
FIG. 4 is a structure diagram of a hybrid vehicle torque adjusting device according to a third embodiment of the disclosure.

With reference to FIG. 4, the third embodiment of the disclosure provides a structure diagram of a hybrid vehicle torque adjusting device, and the device 400 may include:

a requested torque acquisition module 401 configured to acquire a requested torque of the front-axle engine and a requested torque of the rear-axle motor;

a first compensation torque determination module 402 configured to determine a first compensation torque according to the filtered requested torque of the front-axle engine and an actual output torque of the front-axle transmission; and a target torque determination module 403 configured to determine a target torque of the rear-axle motor according to the first compensation torque and the requested torque of the rear-axle motor.

Figure 5:
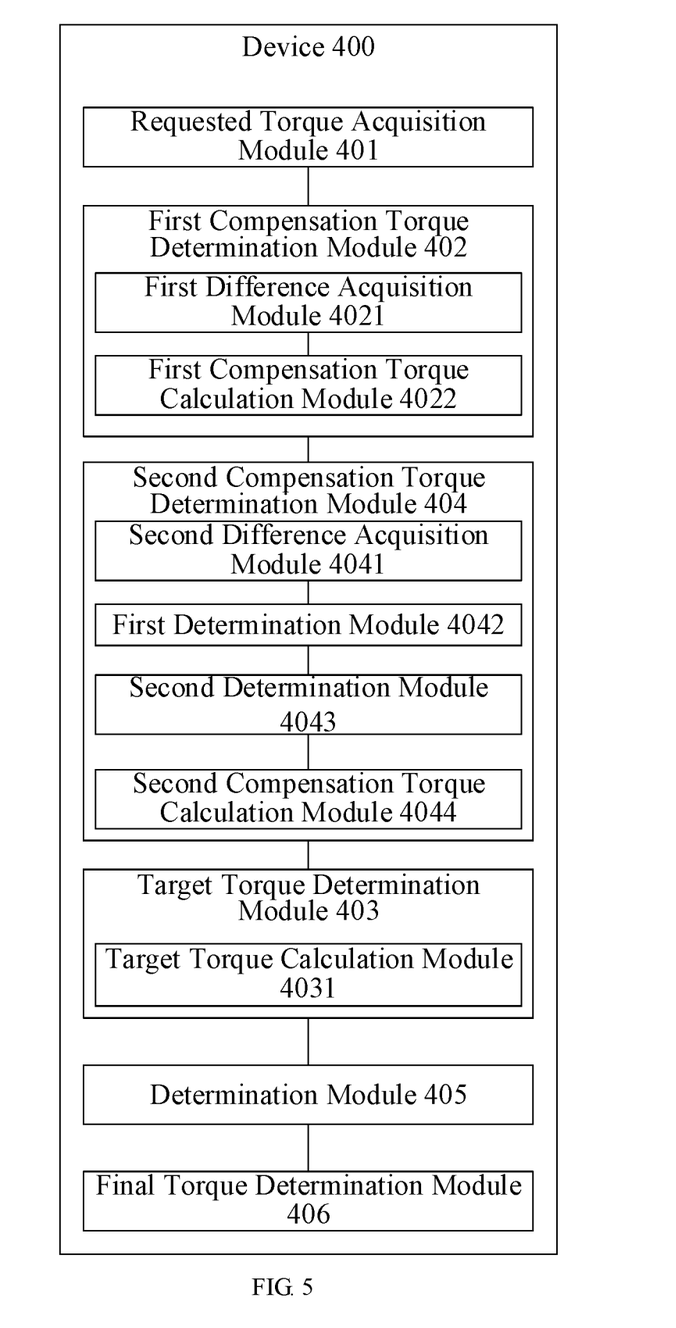
FIG. 5 is another structure diagram of the hybrid vehicle torque adjusting device according to the third embodiment of the disclosure.

With reference to FIG. 5, the third embodiment of the disclosure provides another structure diagram of the hybrid vehicle torque adjusting device.

Based on FIG. 4, preferably, the device 400 may further include:

a second compensation torque determination module 404 configured to determine a second compensation torque according to the filtered requested torque of the front-axle engine and the requested torque of the front-axle engine.

Preferably, the target torque determination module 403 includes:

a target torque calculation module 4031 configured to add the first compensation torque, the second compensation torque and the requested torque of the rear-axle motor to acquire the target torque of the rear-axle motor.

Preferably, the first compensation torque determination module 402 includes:

a first difference acquisition module 4021 configured to, when receiving a shift request, acquire a first difference between the filtered requested torque of the front-axle engine and the actual output torque of the front-axle transmission; and a first compensation torque calculation module 4022 configured to filter a product between the first difference and a compensation coefficient to acquire the first compensation torque.

Preferably, the second compensation torque determination module 404 includes:

a second difference acquisition module 4041 configured to acquire a second difference between the requested torque of the front-axle engine and the filtered requested torque of the front-axle engine;

a first determination module 4042 configured to determine whether the second difference is less than a maximum supporting torque and greater than a minimum supporting torque;

a second determination module 4043 configured to, when the second difference is less than the maximum supporting torque and greater than the minimum supporting torque, determine whether an absolute value of the second difference is less than a dynamically acceptable torque; and a second compensation torque calculation module 4044 configured to, when the absolute value of the second difference is less than the dynamically acceptable torque, determine the second difference as the second compensation torque.

Preferably, the device 400 may further include:

a determination module 405 configured to determine whether the target torque of the rear-axle motor is less than a maximum torque of the motor and greater than a minimum torque of the motor; and a final torque determination module 406 configured to, when the target torque of the rear-axle motor is less than the maximum torque of the motor and greater than the minimum torque of the motor, filter the target torque of the rear-axle motor to acquire a final torque corresponding to the rear-axle motor.

The above hybrid vehicle torque adjusting device is similar to the above hybrid vehicle torque adjusting method, and the related description will not be repeated here.

The above hybrid vehicle torque adjusting device has the same advantages as the above hybrid vehicle torque adjusting method relative to the prior art, which will not be repeated here.

The embodiment of the disclosure further provides a non-transitory computer readable medium having computer programs stored thereon that, when executed by one or more processors of an electronic device, cause the electronic device to perform operations for the hybrid vehicle torque adjusting method according to the first embodiment.

Figure 6:
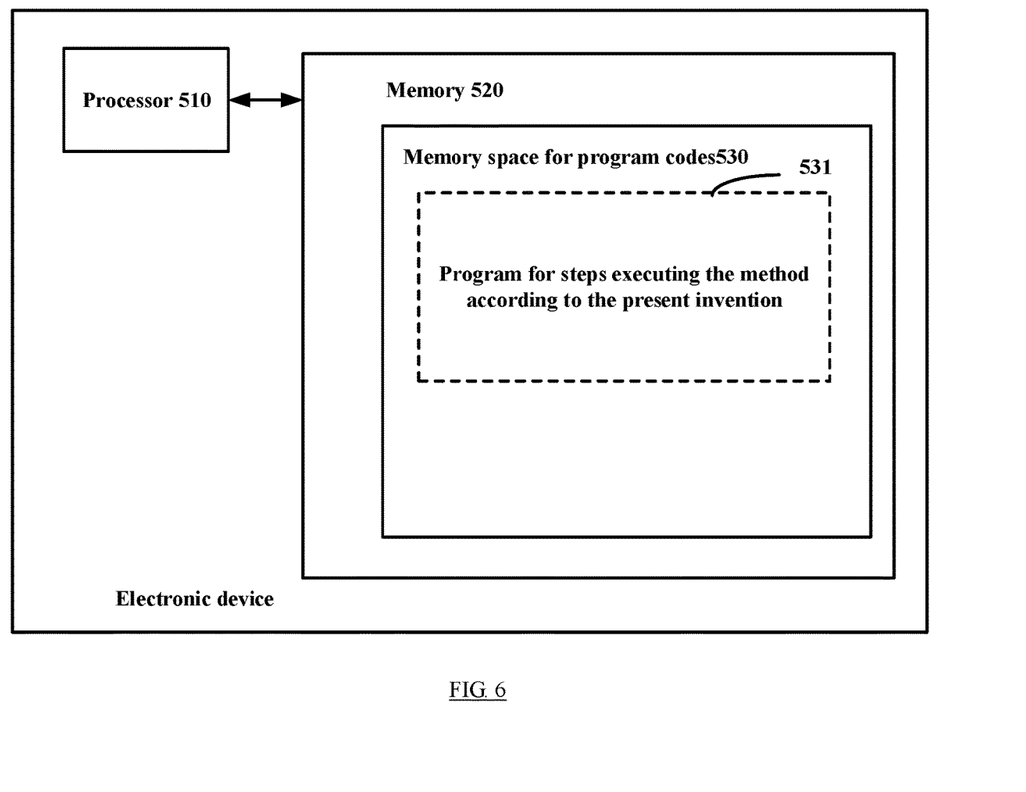
FIG. 6 schematically shows a block diagram of an electronic device used to execute a method for hybrid vehicle torque adjusting according to the present invention.
Figure 7:
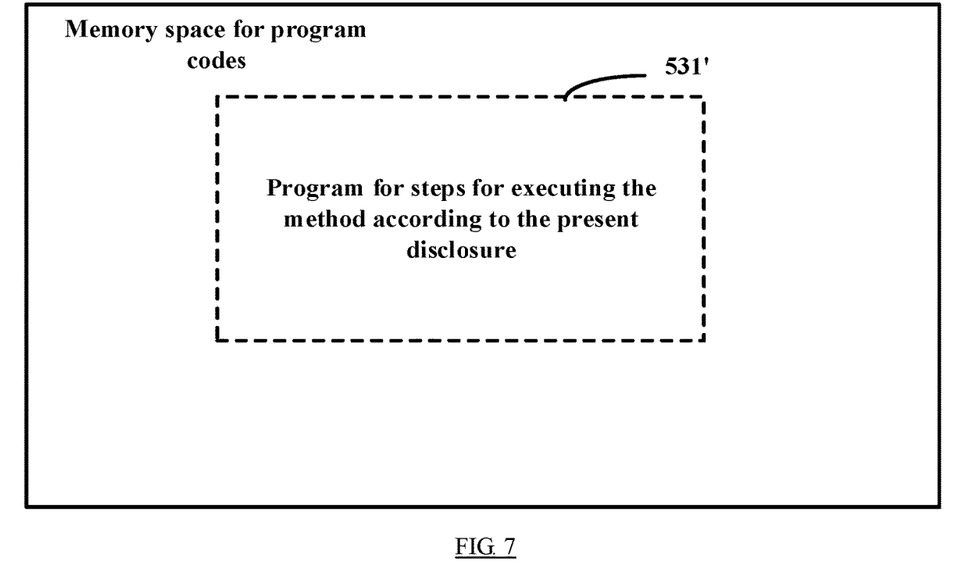
FIG. 7 schematically shows a memory cell used to save or carry program code for realizing a hybrid vehicle torque adjusting method according to the present invention.

The non-transitory computer readable medium includes mechanisms such as computer readable storage or information transmission ways. For example, FIG. 6 is a block diagram of an electronic device for executing the hybrid vehicle torque adjusting method according to the present invention. Traditionally, the electronic device includes a processor 510 and a computer program product or a computer readable medium in form of a memory 520. The memory 520 could be electronic memories such as flash memory, EEPROM (Electrically Erasable Programmable Read-Only Memory), EPROM, hard disk or ROM. The memory 520 has a memory space 530 for program codes 531 executing any steps in the above methods. For example, the memory space 530 for program codes may include respective program codes 531 for implementing the respective steps in the method as mentioned above. These program codes may be read from and/or be written into one or more computer program products. These computer program products include program code carriers such as hard disk, compact disk (CD), memory card or floppy disk. These computer program products are usually the portable or stable memory cells as shown in FIG. 7. The memory cells may be provided with memory sections, memory spaces, etc., similar to the memory 520 of the electronic device as shown in FIG. 6. The program codes may be compressed, for example, in an appropriate form. Usually, the memory cell includes computer readable codes 531' which may be read, for example, by processors 510. When these codes are operated on the electronic device, the electronic device may execute respective steps in the method as described above.

Those described above are merely preferred embodiments of the disclosure, but are not intended to limit the disclosure. Any modifications, equivalent substitutions and improvements made without departing from the spirit and principle of the disclosure shall all fall within the scope of protection of the disclosure.

What is claimed is:

1. A hybrid vehicle torque adjusting method, wherein a hybrid vehicle comprises a front-axle engine, a front-axle transmission and a rear-axle motor, and the method comprises:

acquiring a requested torque of the front-axle engine and a requested torque of the rear-axle motor;

determining a first compensation torque according to a filtered requested torque of the front-axle engine and an actual output torque of the front-axle transmission, and determining a target torque of the rear-axle motor according to the first compensation torque and the requested torque of the rear-axle motor, wherein before the method of determining the target torque of the rear-axle motor according to the first compensation torque and the requested torque of the rear-axle motor, the method further comprises:

determining a second compensation torque according to the filtered requested torque of the front-axle engine and the requested torque of the front-axle engine, and adding the first compensation torque, the second compensation torque and the requested torque of the rear-axle motor to acquire the target torque of the rear-axle motor.

2. The method according to claim 1, wherein the method of determining the first compensation torque according to the filtered requested torque of the front-axle engine and the actual output torque of the front-axle transmission comprises:

when receiving a shift request, acquiring a first difference between the filtered requested torque of the front-axle engine and the actual output torque of the front-axle transmission; and filtering a product between the first difference and a compensation coefficient to acquire the first compensation torque.

3. The method according to claim 2, wherein the method of determining the second compensation torque according to the filtered requested torque of the front-axle engine and the requested torque of the front-axle engine comprises:
  acquiring a second difference between the requested torque of the front-axle engine and the filtered requested torque of the front-axle engine;
  determining whether the second difference is less than a maximum supporting torque and greater than a minimum supporting torque;
  when the second difference is less than the maximum supporting torque and greater than the minimum supporting torque, determining whether an absolute value of the second difference is less than a dynamically acceptable torque; and
  when the absolute value of the second difference is less than the dynamically acceptable torque, determining the second difference as the second compensation torque.

4. The method according to claim 1, wherein after the method of determining the target torque of the rear-axle motor according to the first compensation torque and the requested torque of the rear-axle motor, the method further comprises:
  determining whether the target torque of the rear-axle motor is less than a maximum torque of the rear-axle motor and greater than a minimum torque of the rear-axle motor; and
  when the target torque of the rear-axle motor is less than the maximum torque of the rear-axle motor and greater than the minimum torque of the rear-axle motor, filtering the target torque of the rear-axle motor to acquire a final torque corresponding to the rear-axle motor.

5. An electronic device, comprising:
  a memory having instructions stored thereon;
  a processor configured to execute the instructions to perform operations for hybrid vehicle torque adjusting, the operations comprising:
  acquiring a requested torque of a front-axle engine and a requested torque of a rear-axle motor;
  determining a first compensation torque according to a filtered requested torque of the front-axle engine and an actual output torque of a front-axle transmission;
  determining a target torque of the rear-axle motor according to the first compensation torque and the requested torque of the rear-axle motor, and
  determining a second compensation torque according to the filtered requested torque of the front-axle engine and the requested torque of the front-axle engine,
  wherein the operation of determining the target torque of the rear-axle motor according to the first compensation torque and the requested torque of the rear-axle motor comprises:
    adding the first compensation torque, the second compensation torque and the requested torque of the rear-axle motor to acquire the target torque of the rear-axle motor.

6. The device according to claim 5, wherein the operation of determining a first compensation torque according to a filtered requested torque of the front- axle engine and an actual output torque of a front-axle transmission comprises:
  when receiving a shift request, acquiring a first difference between the filtered requested torque of the front-axle engine and the actual output torque of the front-axle transmission; and
  filtering a product between the first difference and a compensation coefficient to acquire the first compensation torque.

7. A non-transitory computer readable medium having computer programs stored thereon that, when executed by one or more processors of an electronic device, cause the electronic device to perform operations for hybrid vehicle torque adjusting, the operations comprising:
  acquiring a requested torque of a front-axle engine and a requested torque of a rear-axle motor;
  determining a first compensation torque according to a filtered requested torque of the front-axle engine and an actual output torque of a front-axle transmission, and
  determining a target torque of the rear-axle motor according to the first compensation torque and the requested torque of the rear-axle motor,
  wherein before the operation of determining the target torque of the rear-axle motor according to the first compensation torque and the requested torque of the rear-axle motor, the operations further comprise:
    determining a second compensation torque according to the filtered requested torque of the front-axle engine and the requested torque of the front-axle engine, and
  wherein the operation of determining the target torque of the rear-axle motor according to the first compensation torque and the requested torque of the rear-axle motor comprises:
    adding the first compensation torque, the second compensation torque and the requested torque of the rear-axle motor to acquire the target torque of the rear-axle motor.

8. The non-transitory computer readable medium according to claim 7, wherein the operation of determining the first compensation torque according to the filtered requested torque of the front-axle engine and the actual output torque of the front-axle transmission comprises:
  when receiving a shift request, acquiring a first difference between the filtered requested torque of the front-axle engine and the actual output torque of the front-axle transmission; and
  filtering a product between the first difference and a compensation coefficient to acquire the first compensation torque.

9. The non-transitory computer readable medium according to claim 8, wherein the operation of determining the second compensation torque according to the filtered requested torque of the front-axle engine and the requested torque of the front-axle engine comprises:
  acquiring a second difference between the requested torque of the front-axle engine and the filtered requested torque of the front-axle engine;
  determining whether the second difference is less than a maximum supporting torque and greater than a minimum supporting torque;
  when the second difference is less than the maximum supporting torque and greater than the minimum supporting torque, determining whether an absolute value of the second difference is less than a dynamically acceptable torque; and
  when the absolute value of the second difference is less than the dynamically acceptable torque, determining the second difference as the second compensation torque.

10. The non-transitory computer readable medium according to claim 7, wherein the operations further comprise:
   determining whether the target torque of the rear-axle motor is less than a maximum torque of the rear-axle motor and greater than a minimum torque of the rear-axle motor; and
   when the target torque of the rear-axle motor is less than the maximum torque of the rear-axle motor and greater than the minimum torque of the rear-axle motor, filtering the target torque of the rear-axle motor to acquire a final torque corresponding to the rear-axle motor.

11. The electronic device according to claim 6, wherein the operation of determining the second compensation torque according to the filtered requested torque of the front-axle engine and the requested torque of the front-axle engine comprises:
   acquiring a second difference between the requested torque of the front-axle engine and the filtered requested torque of the front-axle engine;
   determining whether the second difference is less than a maximum supporting torque and greater than a minimum supporting torque;
   when the second difference is less than the maximum supporting torque and greater than the minimum supporting torque, determining whether an absolute value of the second difference is less than a dynamically acceptable torque; and
   when the absolute value of the second difference is less than the dynamically acceptable torque, determining the second difference as the second compensation torque.

12. The electronic device according to claim 5, wherein the operations further comprise:
   determining whether the target torque of the rear-axle motor is less than a maximum torque of the rear-axle motor and greater than a minimum torque of the rear-axle motor; and
   when the target torque of the rear-axle motor is less than the maximum torque of the rear-axle motor and greater than the minimum torque of the rear-axle motor, filtering the target torque of the rear-axle motor to acquire a final torque corresponding to the rear-axle motor.

* * * * *